United States Patent [19]

Brazel

[11] Patent Number: 4,892,783

[45] Date of Patent: Jan. 9, 1990

[54] TRI-ELEMENT CARBON BASED HEAT SHIELD

[75] Inventor: James P. Brazel, Berwyn, Pa.

[73] Assignee: General Electric Company, Philadelphia, Pa.

[21] Appl. No.: 269,467

[22] Filed: Nov. 10, 1988

[51] Int. Cl.[4] .............................................. B32B 9/00
[52] U.S. Cl. .................................... 428/282; 427/402; 428/307.7; 428/312.2; 428/312.6; 428/314.4; 428/318.6; 428/408
[58] Field of Search .................. 428/282, 304.4, 306.6, 428/307.3, 307.7, 312.2, 312.6, 314.4, 314.8, 318.6, 408; 427/402

[56] References Cited

U.S. PATENT DOCUMENTS

| | | | |
|---|---|---|---|
| 3,853,586 | 12/1974 | Olcott | 239/265.11 |
| 3,980,105 | 9/1976 | Myskowski | 428/408 |
| 4,442,165 | 4/1984 | Gebhardt et al. | 428/408 |
| 4,472,476 | 9/1984 | Veltri et al. | 428/408 |
| 4,487,799 | 12/1984 | Galasso et al. | 428/408 |

Primary Examiner—William J. Van Balen
Attorney, Agent, or Firm—Allen E. Amgott; Paul Checkovich

[57] ABSTRACT

A tri-element carbon based heat shield has an outer layer including a carbon-carbon composite, a middle layer including pyrolytic graphite deposited onto an inner surface of the outer layer and an inner layer including carbon felt or foam having low density and high mechanical compliance. The thickness of each layer is selected for optimizing thermal protection over the expected operating temperature range. Although a carbon-carbon composite has a higher thermal diffusivity (inversely related to thermal insulation efficiency) than pyrolytic graphite, the carbon-carbon is selected as the outer layer in a minimum thickness sufficient to satisfy the structural strength, ablation and recession requirements of the heat shield. The resulting thickness of the outer layer determines the operating temperature range of the middle layer. At a predetermined temperature, the thermal diffusivity of the inner layer becomes less than that of the middle layer so that the thickness of the inner layer is selected to operate from this predetermined temperature to all lower temperatures.

18 Claims, 2 Drawing Sheets

TRI-ELEMENT CARBON BASED HEAT SHIELD

BACKGROUND OF THE INVENTION

This invention relates to a tri-element carbon based heat shield, and more particularly, to a tri-element carbon based heat shield that beneficially employs three forms of carbon components according to the density, thermal diffusivity and structural strength of each.

One class of heat shields is used to protect components from severe and harsh environments, such as may be encountered by a re-entry type vehicle. Although carbon-carbon re-entry vehicle heat shields have advantages over carbon-phenolic type heat shields, the higher thermal conductivity of carbon-carbon heat shields and lack of an organic sacrificial thermochemical degrading component generally requires a backface, or inwardly disposed, thermal insulation layer which may result in a thermal protection shield that is too heavy, or, if a sufficient thickness of low density insulation is used to compensate for a lesser amount of high density material, an undesirable shift in the center of mass of the re-entry vehicle that disturbs the aerodynamic stability of the re-entry body may be experienced. Carbon-carbon based heat shields are typically used to reduce nuclear radiation absorption in the heat shield and for their desirable particle impact resistance, ablation characteristics and improved structural strength at the expected elevated operating temperatures.

U.S. Pat. No. 4,472,476—Vetri et al discloses a multilayer coating system for protection of carbon-carbon composites. In one embodiment, a layer of pyrolytic graphite is applied to the surface of the carbon-carbon material for obtaining a uniform surface condition for subsequent coating processes. It is the coating that is operationally exposed to the high-temperature environment and not the carbon-carbon material as contemplated by the present invention. U.S. Pat. No. 4,487,799—Galasso et al, having the same named inventors as U.S. Pat. No. 4,472,476, discloses a method for applying a layer of pyrolytic graphite to a carbon-carbon material for preparing the carbon-carbon material to receive another coating.

U.S. Pat. No. 4,442,165—Gebhardt et al discloses and claims a carbon-carbon syntactic foam material which is covered and penetrated by pyrolytic carbon. Pyrolytic graphite is then deposited on a surface of the pyrolytic carbon covered material for improving the thermal insulation of the composite and increasing the strength of the foam material. The pyrolytic graphite layer does not contact the carbon-carbon material and further, no layer of insulation for covering the pyrolytic graphite layer is disclosed.

U.S. Pat. Nos. 3,980,105—Myskowski and 3,853,583—Olcott disclose pyrolytic graphite deposited on a carbonaceous substrate and a carbon substrate, respectively.

Prior carbon-based heat shield structures have included: a combination having an outer shell of dense polycrystalline graphite (e.g. ATJ grade, about 1.6–1.75 gm/cc available from Union Carbide) or a medium density carbon-carbon composite with pyrolytic graphite deposited inside; a combination having an outer shell of polycrystalline graphite (e.g. ATJ grade) or a carbon-carbon composite that includes a low density (about 0.12–0.20 gm/cc) carbon felt or foam inner lining; or a heat shield of moderate density (about 1.4–1.6 gm/cc) carbon-carbon composite (such as Pyro-Carb 406 available from Hitco Corp, Gardena, Calif.), used with no backface insulation.

When used with a dense polycrystalline graphite outer primary shield, a pyrolytic graphite liner backface layer has tended to delaminate, either from the deposition substrate (adhesively) or within itself (cohesively), especially as greater thicknesses of liner are reached. Moreover, the relatively hard, stiff and brittle bi-element heat shield is difficult to bond to a rigid substructure, such as a missile nosecone, because of the low mechanical compliance of the combined heat shield/structure .

A polycrystalline graphite or carbon-carbon composite primary shield used in combination with a carbon or foam backface insulator suffers primarily in weight and thickness comparisons to primary heat shields composed of refractory-reinforced/resin matrix ablative heat shields, such as carbon phenolic. Disadvantages of a primary moderate density heat shield used with no backface insulation component include having higher thermal diffusivity at high temperature than a dense polycrystalline graphite, and also higher thermal diffusivity at low temperature than low density felt or foam insulations. This higher thermal diffusivity requires such a thermal protection system to be heavier and thicker than the multiple element heat shields for obtaining the same relative degree of protection.

Accordingly, it is an object of the present invention to improve the thermal protection efficiency of carbon based heat shied systems while minimizing weight and thickness requirements.

Another object is to improve the thermal performance of the heat shield while maintaining acceptable performance against nuclear radiation.

Yet another object of the present invention is to provide a carbon based heat shield offering adequate thermal protection without exceeding aerodynamic stability requirements.

SUMMARY OF THE INVENTION

In accordance with the present invention, a heat shield comprises an outer layer including a carbonaceous material (selectable from a group including monolithic carbon, graphite and carbon-carbon composite) having an inner surface and an outer surface for operating at a predetermined expected maximum temperature, a middle layer including pyrolytic graphite deposited on the inner surface of the outer layer and an inner layer including a compliant material for abutting the inner surface of the middle layer, wherein the operational temperature at the inner surface of the inner layer is less than a protective limit temperature when the outer surface of the outer layer is at the predetermined expected maximum temperature. The compliant material may include a carbon felt or foam, or a ceramic felt or foam if nuclear radiation is not a concern.

The thicknesses of the layers are selected for maximizing thermal protection efficiency for an object disposed inside the inner surface of the inner layer as indicated by the thermal diffusivity of the material of each layer. Although pyrolytic graphite generally has a lower thermal diffusivity than a carbon-carbon composite, the composite offers superior structural strength, fracture toughness, ablation characteristics and recession properties, such as resistance to erosion from particle impact than pyrolytic graphite.

The thickness of the outer layer may be selected so that the minimum requirements for structural strength, ablation and recession are met. This will establish a maximum temperature, or first transition temperature, at the inner surface of the outer layer when the outer surface of the outer layer is at the predetermined expected maximum temperature. The thickness of the middle layer including pyrolytic graphite is selected so that the middle layer operates in the temperature range from the first transition temperature to a lower second transition temperature below which the thermal diffusivity of the inner layer is less than the thermal diffusivity of the middle layer. The thickness of the inner layer is selected so that the inner layer operates in the temperature range below the second transition temperature, wherein the inner surface of the inner layer is less than or equal to the protective limit temperature.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION OF THE INVENTION

Figure 1:
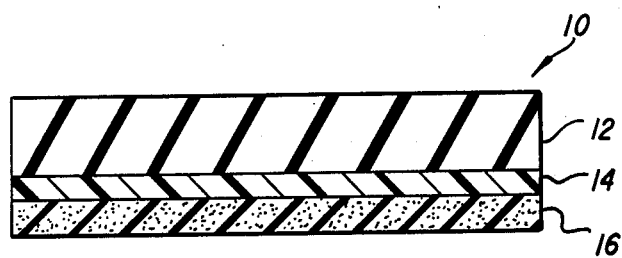
FIG. 1 is a sectional view of a tri-element carbon based heat shield in accordance with the present invention.

Referring to FIG. 1, a sectional view of a portion of a thermal protection system including a tri-element carbon based heat shield in accordance with the present invention is shown. Heat shield 10 includes an outer, or primary, layer 12, a middle layer 14 and an inner layer 16.

Outer layer 12 is sized so that its thickness between the outer and inner surface thereof satisfies the requirements for the external thermal protection system. For a re-entry type vehicle these requirements include thermochemical ablation for controlling the temperature of the inner surface thereof and appropriate recession or erosion characteristics for withstanding physical distress, such as particle impact. In a typical application, outer layer 12 may include a carbon-carbon composite having a thickness in the range of about 0.10 to about 0.80 inches. Alternatively, outer layer 12 may include a polycrystalline graphite which exhibits a monolithic structure but is not as efficient for withstanding structural loads such as bending or surviving particle impact. Although a carbon-carbon composite is more shape stable than a carbon-phenolic material at elevated temperatures, the composite will have fewer of its constituent components thermochemically decomposing and boiling off than does the carbon-phenolic material and thus the inner surface of the composite will be at a relatively higher temperature for the same thickness. It is this additional heat at the inner surface of the composite that must be shielded from internal components that heat shield 10 is designed to protect.

Middle layer 14 includes pyrolytic graphite. Middle layer 14 is deposited directly on the inner surface of layer 12, which acts as the deposition substrate. Due to the porosity of the inner surface of layer 12 and the nature of the deposition process, such as the elevated temperature used, the pyrolytic graphite infiltrates and bonds to the surface of layer 12. Deposition of pyrolytic graphite is well known in the art, such as is described in U.S. Pat. No. 4,442,165—Gebhardt et al which is incorporated by reference thereto in its entirety herein. The step of first depositing pyrolytic carbon is not required for the present invention.

Inner layer 16 may include a rigidized carbon felt, carbon or mineral foam, or a ceramic or any combination thereof or other low density insulation. A rigidized felt typically contains short fibers randomly distributed throughout a matrix material which may be of the same composition as the fibers. A rigidized felt also has increased flexibility and mechanical compliance and is of lower density than the pyrolytic graphite. Foam may be fabricated by introducing a blowing agent into a suspension of the basic component materials of the foam and then casting or molding the suspension while driving off the blowing agent and suspension agent, such as by evaporation. The resulting foam includes voids randomly disposed throughout the material constituting the foam. Foam is also a low density, more mechanically compliant insulation than pyrolytic graphite. Ceramic foams and felts include silica, magnesia and zirconia. One type of carbon foam useful with the present invention is described in U.S. Pat. No. 4,442,165.

Heat shield 10 may assume many shapes. The inner surface of inner layer 16 which constitutes the inner layer of heat shield 10 may be disposed for conforming to the outer surface of a shell or housing which surrounds the components to be protected.

Although it may be possible to make layers 12, 14 and 16 independent from each other, middle layer 14 which includes pyrolytic graphite would be extremely fragile if fabricated as a stand alone shell. By infiltrating and bonding layer 14 directly to the inner surface of layer 12, layer 14 takes advantage of the inherent structural strength of layer 12. Further, it is generally easier to fabricate a pyrolytic graphite layer by direct deposition on a substrate than to fabricate a free-standing shell of pyrolytic graphite that conforms to a substrate, since a layer of pyrolytic graphite can be readily deposited so that it conforms to the shape of the inner surface of layer 12.

Figure 2:
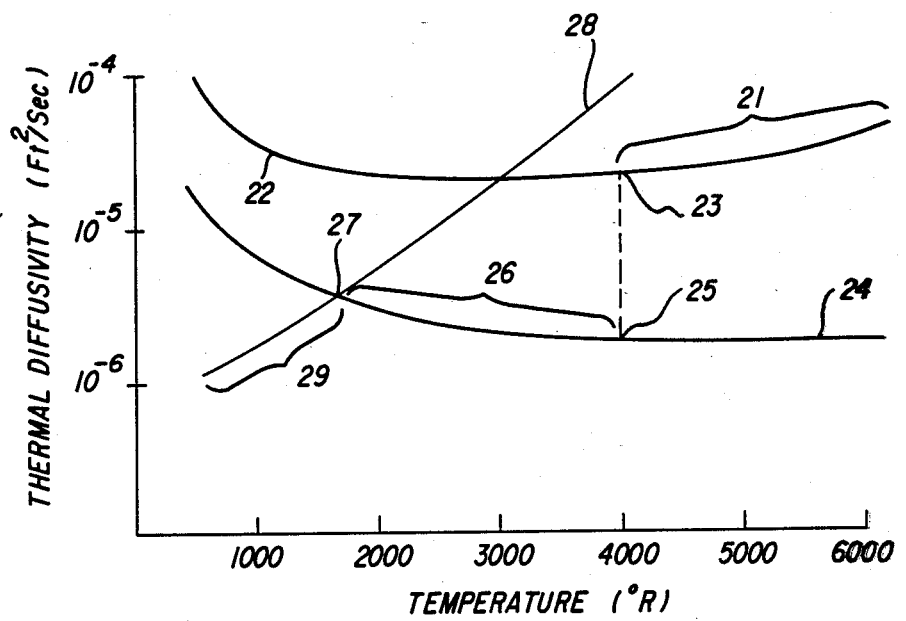
FIG. 2 is a graph illustrating the relative thermal performance of three materials which may be used to form one embodiment of the present invention.

Referring to FIG. 2, a graph illustrating the relative thermal performance of three materials which may be used to form one embodiment of the present invention is shown. The abscissa represents the temperature in degrees Rankine and the ordinate represents thermal diffusivity in $ft^2/sec$. Thermal diffusivity of a material is defined as the thermal conductivity of the material divided by the heat capacity of the material, wherein heat capacity is the product of the density and specific heat of the material.

Curve 22 represents a typical thermal diffusivity characteristic of outer layer 12 (FIG. 1) including a carbon-carbon composite; curve 24 represents one of middle layer 14, including pyrolytic graphite; and curve 28 represents one of inner layer 16 (FIG. 1) including rigidized felt. In accordance with the present invention, the material of each of layers 12, 14 and 16 is used at a thickness and temperature such that heat shield 10

(FIG. 1) is most efficient as a thermal insulator and servicable structure.

The thickness of outer layer 12 is determined by considering the highest temperature expected at the outer surface thereof (typically about 7000° R.) and structural strength required, along with satisfying the ablation and erosion protection requirements for withstanding physical distress in the case of a re-entry vehicle. The thermal insulation performance, or efficiency, of layer 12, when constituting a carbon-carbon component, as characterized by its thermal diffusity (curve 22) at high temperature, is less than that of pyrolytic graphite (curve 24), but pyrolytic graphite has poorer structural performance and has been difficult to fabricate in thicknesses that would be required if only thermal protection (and not structural strength, ablation and erosion) requirements are considered.

The operating temperature into layer 12 decreases, and the thermal diffusivity at a depth within layer 12 along zone 21 is determined by the temperature at the depth. At a predetermined depth from the outer surface of layer 12, i.e. thickness of layer 12, as indicated by point 23, the ablation and erosion protection and structural load bearing requirements of layer 12 are satisfied. From point 23 to a lower temperature, layer 14 including pyrolytic graphite can more efficiently decrease the temperature profile toward inner layer 16 and ultimately toward the components (not shown) to be protected. This increased efficiency for layer 14 is due to the lower thermal diffusivity of pyrolytic graphite (for transient consideration) and thermal conductivity (for steady state or slower heating) over that of the material of layer 12. At transition point 23, which represents the interface between layer 12 and 14, and the minimum temperature of the inner surface of layer 12, when the outer surface of layer 12 is at the expected maximum operating temperature, the temperature is further reduced through layer 14 along zone 26 to a predetermined temperature at the inner surface of layer 14 represented by point 27. Transition point 27 is also at the intersection of curve 24 of middle layer 14 and curve 28 of inner layer 16.

From transition point 27 toward lower temperatures, inner layer 16 has a lower thermal diffusivity than does middle layer 14 and thus is a more efficient thermal insulator at temperatures less than that indicated by transition point 27. The thickness of inner layer 16 is sufficient so that the inner surface of layer 16 is at the desired, or protective limit, temperature, which is typically about 200° C. or about 852° R., when the temperature at the outer surface of layer 16 is at the temperature of transition point 27. Of course, the temperature of the inner surface of layer 16 may be higher or lower, depending on the thickness of layer 16.

Unlike a combination of three separate layers fabricated from the same materials as layers 12, 14 and 16, respectively, by depositing middle layer 14 onto the inner surface of outer layer 12 of heat shield 10 in accordance with the present invention, problems associated with the mechanical fragility of a free-standing or adhesively bonded shell of pyrolytic graphite are minimized and the manufacturing processing necessary to conform the outer surface of a free-standing shell to the inner surface of the outer layer are eliminated.

Figure 3:
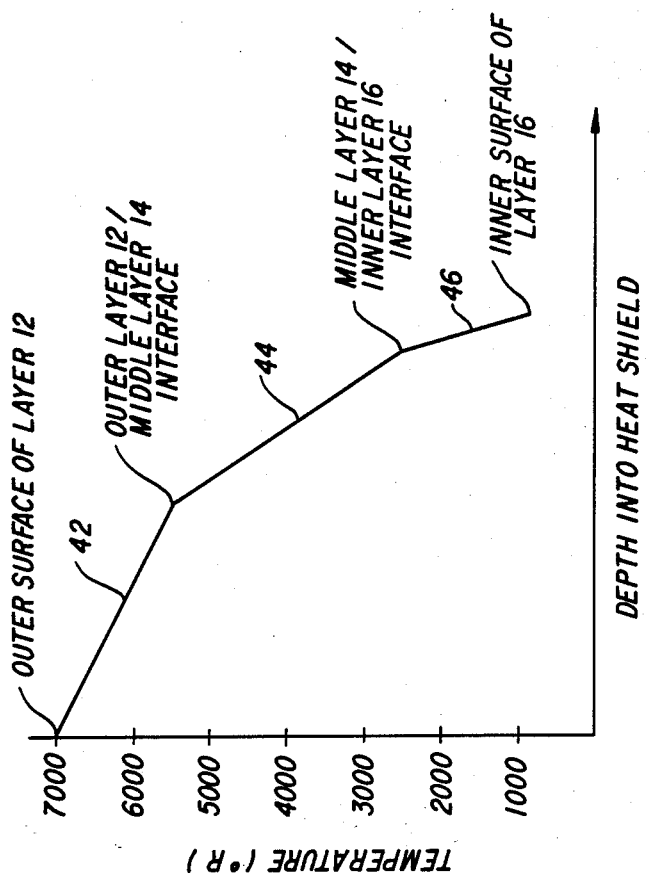
FIG. 3 is a graph illustrating a typical temperature profile curve through a heat shield in accordance with the present invention.

Referring to FIG. 3, a graph illustrating a typical temperature profile curve across heat shield 10 in accordance with the present invention is shown. Portion 42 of the curve represents the temperature profile from the outer surface of layer 12 to the inner surface of layer 12, or the interface of layers 12 and 14. Portion 44 of the curve represents the temperature profile from the outer surface of middle layer 14 to the inner surface of layer 14, or the interface of layer 14 and 16. Portion 46 of the curve represents the temperature profile from the outer surface of inner layer 16 to the inner surface of layer 16.

For fabricating heat shield 10, middle layer 14 may be deposited on the inner surface of outer layer 12 by chemical vapor deposition. When outer layer 12 includes a carbon-carbon composite, middle layer 14 may be formed by subjecting the carbon-carbon composite to a temperature in the range of about 1800° C. to 2100° C. in an atmosphere of a hydrocarbon gas, such as methane with an inert diluent such as hydrogen, in a ratio of about 75-25:25-75 volume percent hydrogen to methane, at a pressure of about 10 mmHg, for a period adequate to form layer 14 of the desired thickness. For applications relating to a heat shield of a re-entry type vehicle, a pyrolytic graphite thickness of about 0.020 to 0.25 inches, with a preferred range of about 0.025 to about 0.050 inches, should suffice. For re-entry applications, it is undesirable to exceed a thickness of about 0.25 inches for layer 14, since problems relating to the brittleness of pyrolytic graphite may be encountered at greater thicknesses. Alternatively, any of the well-known chemical vapor deposition techniques such as, for example, those disclosed in U.S. Pat. No. 4,442,165, that are capable of depositing the required amount of pyrolytic graphite while maintaining the structural integrity of the substrate of layer 12 may be used.

Thus has been illustrated and described an improved carbon based heat shield having minimized weight and thickness requirements while maintaining acceptable performance against nuclear radiation, without exceeding aerodynamic stability requirements.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A heat shield comprising:
    layer including a carbonaceous material, the outer layer having a first thermal diffusivity, an outer surface, an inner surface and a thickness disposed between the outer and inner surface, the outer surface for operating at a predetermined expected maximum temperature;
    a middle layer including pyrolytic graphite, the middle layer deposited on the inner surface of the outer layer, the middle layer having a second thermal diffusivity, an inner surface and a thickness disposed between the inner surface of the outer layer and the inner surface of the middle layer; and
    an inner layer including a compliant material having an outer surface for abutting the inner surface of the middle layer, the inner layer having a third thermal diffusivity, an inner surface and a thickness disposed between the outer and inner surface, wherein the operational temperature at the inner surface of the inner layer is less than a protective limit temperature when the outer surface of the outer layer is at the predetermined expected maximum temperature.

2. The heat shield as in claim 1, wherein the third thermal diffusivity is less than the first and second thermal diffusivity below a first predetermined temperature, the second thermal diffusivity is less than the fist and third thermal diffusivity at temperatures between the first and a second predetermined temperature, the second predetermined temperature greater than the first predetermined temperature, and the first thermal diffusivity greater than the second thermal diffusivity at temperatures above the second predetermined temperature.

3. The heat shield as in claim 2, wherein the thickness of the outer layer is sufficient so that the temperature at the inner surface of the outer layer does not exceed the second predetermined temperature when the outer surface of the outer layer is at the predetermined expected maximum temperature.

4. The heat shield as in claim 3, wherein the predetermined expected maximum temperature is about 7000° R.

5. The heat shield as in claim 3, wherein the thickness of the outer layer is sufficient for accommodating physical distress such as ablation and particle impact.

6. The heat shield as in claim 2, wherein the thickness of the outer layer is sufficient for accommodating physical distress such as ablation and particle impact, for providing adequate structural strength and for ensuring that the temperature at the inner surface of the outer layer is at the second predetermined temperature when the outer surface of the outer layer is at the predetermined expected maximum temperature.

7. The heat shield as in claim 3, wherein the thickness of the middle layer is sufficient so that the inner surface of the middle layer is at the first predetermined temperature when the inner surface of the outer layer is at the second predetermined temperature.

8. The heat shield as in claim 7, wherein the thickness of the inner layer is sufficient so that the inner surface of the inner layer is less than the protective limit temperature when the outer surface of the inner layer is at the first predetermined temperature.

9. The heat shield as in claim 1, wherein the compliant material includes a carbon foam.

10. The heat shield as in claim 1, wherein the compliant material includes a carbon felt.

11. The heat shield as in claim 1, wherein the compliant material includes a ceramic.

12. The heat shield as in claim 1, wherein the carbonaceous material is selected from the group consisting of monolithic carbon, graphite and carbon-carbon composite.

13. A method for shielding an object from a source of heat, comprising:
depositing a first layer of pyrolytic graphite on a first surface of a carbonaceous material, the carbonaceous material having a second surface for facing the source of heat when the first surface faces the object, a first thermal diffusivity and a first thickness disposed between the first and second surface, further, the deposited layer having a third surface for facing the object, a second thickness disposed between the first and third surface and a second thermal diffusivity;
abutting a second layer including a low density heat insulative material against the third surface, the second layer having a fourth surface conformable to the third surface, a fifth surface for facing the object, a third thickness disposed between the fourth and fifth surface and a third thermal diffusivity; and
providing a sufficient first thickness so that the temperature at the first surface does not exceed a first predetermined temperature when the temperature at the second surface is exposed to a predetermined maximum temperature and the second surface is exposed to a predetermined amount of ablation;
providing a sufficient second thickness so that the temperature at the third surface does not exceed a second predetermined temperature when the temperature at the first surface is at the first predetermined temperature; and
providing a sufficient third thickness so that the temperature at the fifth surface does not exceed a predetermined protective limit temperature when the temperature at the fourth surface is at the second predetermined temperature.

14. The method as in claim 13, wherein heat insulative material includes a carbon foam.

15. The method as in claim 13, wherein the low density heat insulative material includes a carbon felt.

16. The method as in claim 13, wherein the second thermal diffusivity is less than the first and third thermal diffusivity between the first and second predetermined temperatures, and further wherein the third thermal diffusivity is less than the first and second thermal diffusivity at temperatures less than the second predetermined temperature, and the first thermal diffusivity is greater than the second thermal diffusivity at temperatures above the first predetermined temperature, and further wherein the steps of providing the first and second thickness, respectively, include the step of providing the thickness in response to the first and second thermal diffusivity, respectively, and yet further wherein the step of providing the first thickness includes providing the first thickness for accommodating expected ablation of and particle impact on the second surface of the carbon-carbon material, such that the first and second temperatures provide optimum heat shielding for the required first, second and third thicknesses.

17. The method as in claim 13, wherein the second thermal diffusivity is less than the first and third thermal diffusivity between the first and second predetermined temperatures and further wherein the third thermal diffusivity is less than the first and second thermal diffusivity at temperatures less than the second predetermined temperature, and the first thermal diffusivity is greater than the second thermal diffusivity at temperatures above the first predetermined temperature, the step of providing a first thickness further includes minimizing the first thickness for maximizing the value of the second predetermined temperature while providing an adequate first thickness for satisfying the ablation, particle impact resistance and structural strength requirements of the carbon-carbon composite material.

18. The method as in claim 13, wherein the carbonaceous material is selected from the group consisting of graphite, monolithic carbon and carbon-carbon composite.

* * * * *